(12) United States Patent
Holub et al.

(10) Patent No.: US 10,503,192 B2
(45) Date of Patent: *Dec. 10, 2019

(54) ENERGY CONSUMPTION MODELING (71) Applicant: Ademco Inc., Golden Valley, MN (US)

(72) Inventors: Ondrej Holub, Prague (CZ); Jan Berka, Prague (CZ); Marek Sikora, Kurim (CZ)

(73) Assignee: Ademco Inc., Golden Valley, MN (US)

( * ) Notice: Subject to any disclaimer, the term of this patent is extended or adjusted under 35 U.S.C. 154(b) by 58 days.

This patent is subject to a terminal disclaimer.

(21) Appl. No.: 15/847,220

(22) Filed: Dec. 19, 2017

(65) Prior Publication Data

US 2018/0107233 A1    Apr. 19, 2018

Related U.S. Application Data

(63) Continuation of application No. 14/733,540, filed on Jun. 8, 2015, now Pat. No. 9,898,024.

(51) Int. Cl.
    *G05F 1/66*     (2006.01)
    *G05B 15/02*    (2006.01)
    *G06N 5/02*     (2006.01)
    *G05B 23/02*    (2006.01)
    *G06N 7/00*     (2006.01)

(52) U.S. Cl.
    CPC ............ *G05F 1/66* (2013.01); *G05B 15/02* (2013.01); *G05B 23/0227* (2013.01); *G06N 5/02* (2013.01); *G06N 7/005* (2013.01); *G05B 2219/24075* (2013.01); *G05B 2219/2642* (2013.01)

(58) Field of Classification Search
    CPC .......... G05B 15/02; G05B 2219/24075; G05B 2219/2642; G05B 23/02; G05F 1/66; G06N 5/02
    See application file for complete search history.

(56) References Cited

U.S. PATENT DOCUMENTS

| | | | |
|---|---|---|---|
| 8,527,105 B1 | 9/2013 | Choong et al. | |
| 2012/0022700 A1* | 1/2012 | Drees ................ | G05B 15/02 700/276 |
| 2012/0048952 A1 | 3/2012 | Slingsby et al. | |
| 2014/0107850 A1 | 4/2014 | Curtis | |
| 2014/0277769 A1 | 9/2014 | Matsuoka et al. | |
| 2014/0324240 A1 | 10/2014 | Thottan et al. | |

(Continued)

OTHER PUBLICATIONS

Prosecution History from U.S. Appl. No. 14/733,540, dated Jun. 26, 2017-Oct. 19, 2017, 57 pp.

(Continued)

*Primary Examiner* — Yuhui R Pan
(74) *Attorney, Agent, or Firm* — Shumaker & Sieffert, P.A.

(57) ABSTRACT

Methods, devices, and systems for energy consumption modeling are described herein. One device includes a memory, and a processor configured to execute executable instructions stored in the memory to assign energy consumption data to an on state and an off state of a device, generate a model configured to predict a future state of the device and a duration of the future state based on a duration of a current state of the device, a duration of a previous state of the device, and operating conditions of the device, and predict a future energy consumption of the device using the assigned energy consumption data and the generated model.

18 Claims, 5 Drawing Sheets

(56) References Cited

U.S. PATENT DOCUMENTS

| | | |
|---|---|---|
| 2014/0379298 A1 | 12/2014 | Gilbert |
| 2015/0067357 A1 | 3/2015 | Arora et al. |
| 2016/0003876 A1* | 1/2016 | Matsuyama ............ G06Q 50/06 702/60 |
| 2016/0212506 A1 | 7/2016 | Norwood et al. |

OTHER PUBLICATIONS

Michael James Siemann. Performance and Applications of Residential Building Energy Grey-Box Models. Mechanical Engineering Theses and Dissertations. University of Maryland. 2013. Accessed from http://drum.lib.umd.edu/handle/1903/14299. 166 pages.

Emre Can Kara, et al. Quantifying Flexibility of Residential Thermostatically Controlled Loads for Demand Response: A Data:driven Approach. BuildSys ' 14 Nov. 5-6, 2014, Memphis, TN. pp. 140-147.

Krystian X. Perez, et al. Meter to Models: Using Smart Meter Data to Predict and Control Home Energy Use. Accessed from http://www.pecanstreet.org/wordpress/wp-content/uploads/2014/06/PikePowers-Perez.pdf. on Apr. 16, 2015. 12 pages.

* cited by examiner

ENERGY CONSUMPTION MODELING

PRIORITY INFORMATION

This application is a Continuation of U.S. application Ser. No. 14/733,540, filed Jun. 8, 2015, the contents of which are incorporated herein by reference.

TECHNICAL FIELD

The present disclosure relates to methods, devices, and systems for energy consumption modeling.

BACKGROUND

Connected devices can enable users to wirelessly access and control those devices. For example, a connected thermostat can allow a user to change the temperature settings of their home from any location.

Connected devices have been gaining popularity among consumers. For example, many commercial buildings utilize smart automation and control systems for building system control. In particular, many commercial buildings can utilize smart automation and controls to operate heating, ventilation, and air-conditioning (HVAC) systems based on a number of parameters (e.g., time of day, day of the week, seasonal ambient temperatures, etc.) This data can be useful for utility companies for load forecasting and estimating real-time demand response capacity.

However, this information can be more difficult for utility companies to acquire in the residential sector. The difficulty in obtaining this information can result from simple devices typically found in many residences that can include only ON/OFF states, or devices with only a few ON states as well as an OFF state. Further, many of these simple devices are not connected devices. Residential users may not want to purchase more complex and connected control systems as cost can be a prohibitive factor.

DETAILED DESCRIPTION

Methods, devices, and systems for energy consumption modeling are described herein. For example, one or more embodiments include a memory, and a processor configured to execute executable instructions stored in the memory to assign energy consumption data to an on state and an off state of a device, generate a model configured to predict a future state of the device and a duration of the future state based on a duration of a current state of the device, a duration of a previous state of the device, and operating conditions of the device, and predict a future energy consumption of the device using the assigned energy consumption data and the generated model.

Energy consumption modeling, in accordance with the present disclosure, can allow a utility to enable services such as load forecasting for consumption aggregators and/or decision support for residential demand response by utilizing consumption data from each individual connected device among a population of connected devices. These services can be implemented by more easily capturing energy consumption data that is available from residential users who use connected devices. Further, energy consumption modeling in accordance with the present disclosure can provide a financial incentive to encourage residential users to purchase a connected device by monitoring for performance degradation and/or detecting faults in a connected device.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing.

As used herein, "a" or "a number of" something can refer to one or more such things. For example, "a number of previous states" can refer to one or more previous states.

Figure 1:
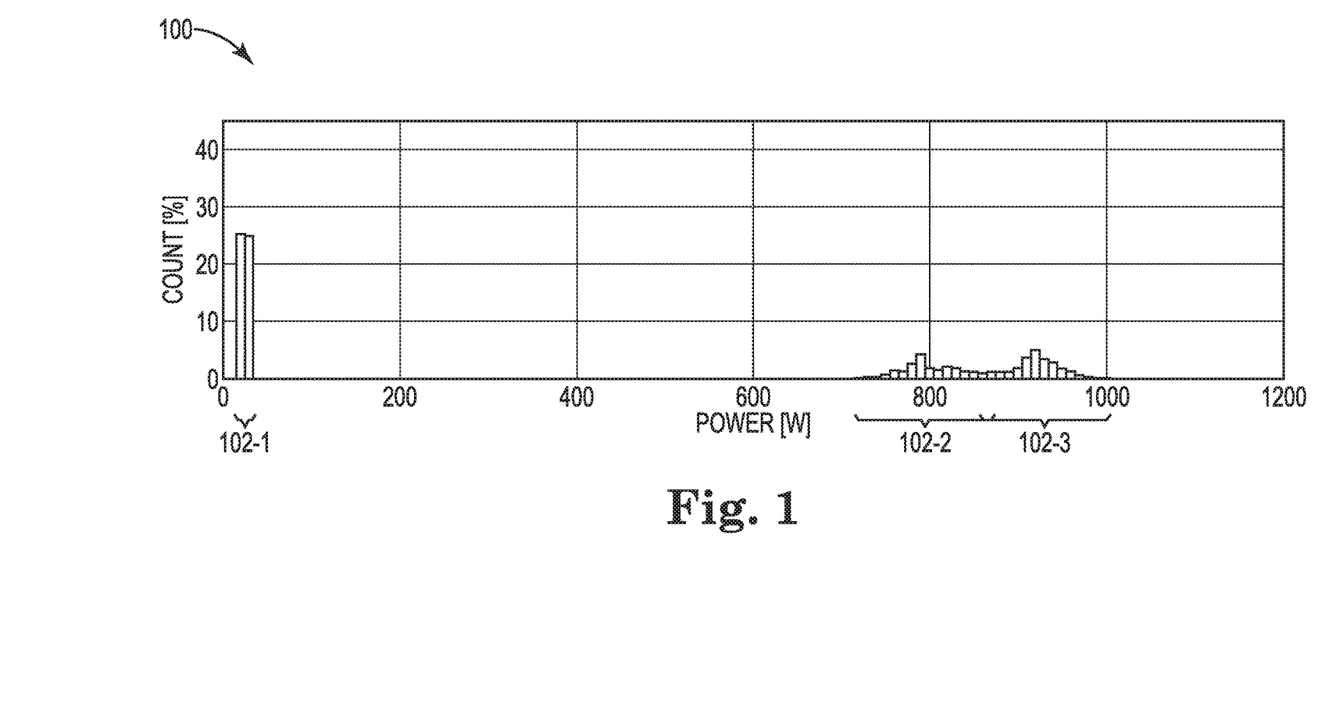
FIG. 1 illustrates an example of a histogram of logged energy consumption data of a device that can be utilized in one or more embodiments of the present disclosure.

FIG. 1 illustrates an example of a histogram 100 of logged energy consumption data 102 of a device that can be utilized in one or more embodiments of the present disclosure. As shown in FIG. 1, the histogram 100 can include logged energy consumption data 102-1, 102-2, and 102-3.

Energy consumption data can include data corresponding to the consumption of electrical energy by an electrical device. For example, a device (e.g., a refrigerator) can consume an amount of electrical energy (e.g., 100 Watts) over a period of time (e.g., 12 hours).

Energy consumption data 102-1, 102-2, and 102-3 can be assigned by a controller (e.g., controller 540 as described in connection with FIG. 5) to an off state and an on state of a device. For example, energy consumption data 102-1 can be assigned to an off state, energy consumption data 102-2 can be assigned to a first on state, and energy consumption data 102-3 can be assigned to a second on state, as will be further described herein.

In some embodiments, the device can be a thermostatically controlled device. A thermostatically controlled device, as used herein, can be a device that automatically responds to changes in temperature. For example, a thermostatically controlled device can include a thermostat, an air-conditioner, a heat pump, a boiler, a refrigerator, a freezer, or other residential appliances. However, embodiments of the present disclosure are not so limited.

In some embodiments, the controller can be part of a residential thermostat. For example, a residential thermostat can include a controller to assign energy consumption data to each state of the thermostat.

In some embodiments, the controller can be part of an energy meter. For example, the energy meter can be a device that measures the amount of electric energy consumed by a residence, business, or an electrically powered device. That is, the energy meter can be a meter measuring energy consumption for an entire residence or business, or a meter dedicated to a single electrically powered device.

In some embodiments, the controller can be remote to the device and/or the energy meter. The controller can be connected to the device and/or the energy meter via a network. As used herein, a network can be a network relationship that connects the controller to the device and/or the energy meter. For example, the controller can be connected to the device and/or the energy meter via a local area network (LAN), wide area network (WAN), personal area network (PAN), a distributed computing environment (e.g., a cloud computing environment), and/or the Internet, among other types of network relationships.

In the example shown in FIG. 1, the device can have multiple states. For example, the device can have an off state, a first on state, and a second on state. As an example, an air-conditioner can have an off state and a plurality of on states. The plurality of on states can correspond to the levels of cooling capacity (e.g., ability to remove heat) associated with the air-conditioner. That is, a first on state can correspond to a cooling capacity that is lower relative to a cooling capacity associated with a second on state.

Although the device is described as consisting of three states, embodiments of the present disclosure are not so limited. For example, the amount of states can vary by device. That is, a device can consist of two states (e.g., an off state and an on state), or more than three states (e.g., an off state, and N number of on states).

Each of the plurality of states of a device can be associated with a different level of energy consumption. For example, the plurality of on states of an air conditioner can correspond to different levels of cooling capacity, and therefore different levels of energy consumption. As the cooling capacity differs at each on state (e.g., the first on state can remove 10 Watts of heat energy, the second on state can remove 20 Watts of heat energy), the energy consumption of each state can also differ (e.g., first on state consumes 10 Watts of electricity, second on state consumes 20 Watts of electricity).

The controller can receive the energy consumption data from an energy meter connected to the device. For example, the controller can receive and log energy consumption data 102-1, 102-2, and 102-3 measured by an energy meter.

The controller can assign energy consumption data 102-1, 102-2, and 102-3 to a plurality of states of the device. For example, energy consumption can depend primarily on the state of the device. The controller can process energy consumption data 102-1 received from the energy meter and assign an off state to energy consumption data 102-1 based on the level of power of energy consumption data 102-1 (e.g., based on the low power level of energy consumption data 102-1 as compared to energy consumption data 102-2 and 102-3). Further, the controller can assign a first on state to energy consumption data 102-2, and a second on state to energy consumption data 102-3.

In some embodiments, the controller can assign energy consumption data 102-1, 102-2, and 102-3 to a device state based on peak (e.g., most frequent) values of logged consumption data. For example, the controller can process energy consumption data 102-1, 102-2, and 102-3, that results in a peak value of 10 Watts that was logged during a first time period, a peak value of 700 Watts that was logged during a second time period, and a peak value of 950 Watts that was logged during a third time period. The controller can assign, based on the peak values, energy consumption data 102-1, 102-2, and 102-3 to a plurality of states of the device. That is, the controller can assign energy consumption data 102-1 to an off state, energy consumption data 102-2 to a first on state, and energy consumption data 102-3 to a second on state based on the peak values of 10 Watts, 700 Watts, and 950 Watts, respectively.

In some embodiments, the controller can assign energy consumption data based on a distribution of the histogram 100. The controller can process energy consumption data 102-1, 102-2, and 102-3 that results in a distribution of data for energy consumption data 102-2 and 102-3. The controller can assign energy consumption data 102-2 and 102-3 to a first on state and a second on state, respectively, based on the distribution of energy consumption data 102-2 and 102-3 on histogram 100. For example, the controller can assign energy consumption data 102-2 and 102-3 using a Gaussian mixture model. However, embodiments of the present disclosure are not so limited. For example, the controller can assign energy consumption data 102-2 and 102-3 using any other statistical technique utilizing the distribution of the data in histogram 100.

Although energy consumption data 102-1, 102-2, and 102-3 are described as being logged by an energy meter, embodiments of the present disclosure are not so limited. For example, an energy meter may not be available to log energy consumption data 102-1, 102-2, and 102-3 of the device. In some such embodiments, the energy consumption data 102-1, 102-2, and 102-3 can be nominal energy consumption data. For example, nominal energy consumption data can be energy consumption data from a datasheet of the device (e.g., energy consumption data provided by the device manufacturer). The datasheet of the device can provide projected energy consumption data of each stage of the device.

Nominal energy consumption data can be entered into the controller manually. For example, nominal energy consumption data can be entered by a user (e.g., a building manager, contractor, technician, etc.) during installation of the device. That is, energy consumption data 102-1, 102-2, and 102-3 can be data manually entered into the controller from a device datasheet during installation of the device by a contractor or other user.

In some embodiments in which an energy meter is not available, the energy consumption data can be received by the controller from additional users. Additional users can have similar and/or the same devices with similar and/or the same device consumption data. For example, the controller can receive the similar energy consumption data from additional users that have similar device consumption data via a network relationship such as a local area network (LAN), wide area network (WAN), personal area network (PAN), a distributed computing environment (e.g., a cloud computing environment), and/or the Internet, among other types of network relationships.

Similarity of data can include whether the additional users have the same devices (e.g., same type, same manufacturer), or a similar device (e.g., in the case of an air-conditioner, similar cooling capacity, similar number of states, similarity of compressor, etc.) Further, similarity of data can include operating conditions (e.g., geographical location, average ambient temperatures, daily temperature ranges, etc.)

Figure 2:
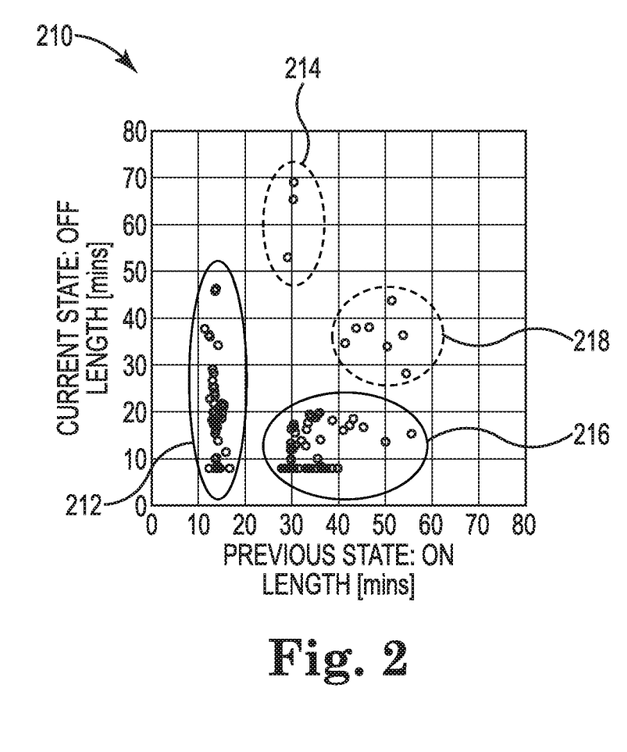
FIG. 2 illustrates an example of energy consumption data history that can be utilized in one or more embodiments of the present disclosure.

FIG. 2 illustrates an example of energy consumption data history 210 that can be utilized in one or more embodiments of the present disclosure. As shown in FIG. 2, the energy consumption data history 210 can include off state data 212, on state data 216, off state outlier data 214, and on state outlier data 218.

A controller (e.g., controller 540, as described in connection with FIG. 5) can generate a model configured to predict a future state of a device and a duration of the future state of the device based on a duration of a current state of the device, a duration of a previous state of the device, and operating conditions of the device. The operating conditions of the device can include, for example, the ambient outside air temperature, a temperature setpoint of the device, and/or a combination thereof.

Although operating conditions of the device are described as including ambient outside air temperature and/or a temperature setpoint of the device, embodiments of the present disclosure are not so limited. For example, operating conditions of the device can include other variables to predict a future state of the device.

Figure 3:
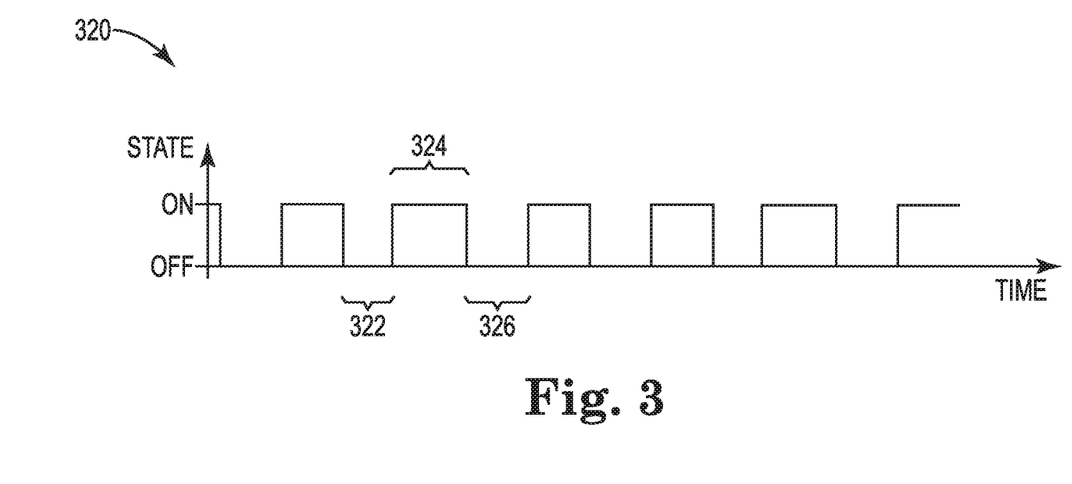
FIG. 3 illustrates an example of predicted durations of states that can be utilized in one or more embodiments of the present disclosure.

The model can be generated by, for example, generating a probability distribution for a duration of the current state of the device as a function of the duration of the previous state of the device, and predicting a transition between the current state of the device and the future state of the device using the probability distribution and an amount of time already spent in the current state, as will be further described herein (e.g., in connection with FIG. 3).

The model can be in the form of a probabilistic state machine. As shown in FIG. 2, energy consumption data history 210 can include on state data 216 and off state data 212. The on state data 216 and off state data 212 can be data logged by the controller (e.g., as described in connection with FIG. 1) or, in the case of an energy meter not being available, can be nominal consumption data inferred from a datasheet of the device (e.g., as described in connection with FIG. 1), or energy consumption data received from additional users (e.g., as described in connection with FIG. 1).

In the embodiment shown in FIG. 2, the current state of the device is off, as represented by the vertical axis of FIG. 2. Additionally, the previous state of the device is on, as represented by the horizontal axis of FIG. 2. For example, a prediction as to the next state (e.g., the on state) and the duration of the next state (e.g., the on state) can be made based on the duration of the current state (e.g., the off state) and a duration of the previous state (e.g., the on state).

The probability distribution for the duration of the current state (e.g., the off state) of the device as a function of the duration of the previous state (e.g., the on state) of the device can be derived from energy consumption data history 210 of off state data 212 and on state data 216. For example, the probability distribution of the duration of the off state (e.g., the current state) can be derived based on the time already spent in the off state as a function of the length of the on state (e.g., the previous state).

The model can be updated based on additional energy consumption data received by the controller from an energy meter. For example, with every new state transition (e.g., the off state to the on state, and/or the on state to the off state) that is logged and detected, the statistics of the state transitions can be updated. That is, new data can be added to energy consumption data history 210 by adding new off state data 212 and new on state data 216 as it is received by the controller.

As the model is updated based on additional energy consumption data, the probability distribution for the duration of the current state of the device as a function of the duration of the previous state of the device can also be updated. For example, the probability of the duration of the current state can continuously be updated for accuracy based on additional energy consumption data. Continuously updating the probability distribution in this way can maintain accuracy of the model.

The update frequency of the model can vary. For example, the frequency with which the model is updated can be selected by a user. The user can set the update frequency as a particular number of state transitions (e.g., 10 state transitions before the model is updated). As another example, the user can set the update frequency as a particular time period (e.g., set the model to update once per hour, once per day, etc.) Additionally, the model can be updated monthly and/or seasonally (e.g., fall, winter, spring, and/or summer).

The probability distribution can be generated while ignoring outlier data. Outlier data, as used herein, can be data that, due to variability in a measurement or some other error, is too distant from other data to be used in the probability distribution.

For example, as shown in FIG. 2, energy consumption data history 210 can include off state outlier data 214 and on state outlier data 218. Off state outlier data 214 and on state outlier data 218 can be excluded from use in off state data 212 and on state data 216, respectively, as inclusion of outlier data can yield unexpected and erroneous probability distributions.

Off state outlier data 214 and on state outlier data 218 can be identified and excluded using various statistical techniques. For example, outlier data can be excluded using trimmed means, where a selected percentage of the largest and smallest data observations are removed from the sample population. However, embodiments of the present disclosure are not so limited. For example, any other statistical technique to identify and exclude outliers may be used.

Although the model is described as comprising only an off state and an on state, embodiments of the present disclosure are not so limited. For example, the controller can generate a model with an off state and a plurality of on states.

The controller can generate a model configured to predict a duration of a plurality of future states of the device based on the duration of the current state of the device, a duration of the plurality of previous states of the device, and operating conditions of the device. That is, the controller can generate a probability distribution for a duration of a current state of the plurality of on states of the device as a function of the number of the plurality of on states.

Analogous to the embodiment with an off state and an on state, the model comprising a plurality of on states can be in the form of a probabilistic state machine, with off state data and a plurality of on state data logged by the controller or received by the controller through nominal data or from other users. The probability distribution for the duration of the current on state of the device as a function the duration of the previous on state of the device can be derived from energy consumption data history.

The plurality of predicted durations of the future states of the device can be the same as the plurality of durations of the previous states of the device. That is, the probability distribution of the duration of the current on state can be derived based on the time already spent in the on state as a function of the length of the number of previous on states. For example, if the device comprises three on states, the probability distribution can utilize the length of the previous three on states in determining the distribution of the duration of the current on state and/or the predicted duration of the next three on states.

FIG. 3 illustrates an example of predicted durations of states 320 that can be utilized in one or more embodiments of the present disclosure. As shown in FIG. 3, the predicted durations of states 320 can include predicted durations of a current state 322, a future state 324, and an additional future state 326.

A controller (e.g., controller 540, as described in connection with FIG. 5) can generate a model configured to predict a future state of a device and a duration of the future state of the device based on a duration of a current state of the device, a duration of a previous state of the device, and operating conditions of the device. The model can be generated by generating a probability distribution for a duration of the current state of the device as a function of the duration of the previous state of the device (e.g., as described previously in connection with FIG. 2), and predicting a transition between the current state of the device and the future state of the device using the probability distribution and an amount of time already spent in the current state.

For example, the controller can predict the start of future state 324 based on an amount of time already spent in current state 322. The change from current state 322 to future state 324 can be predicted using the most likely switching time from the probability distribution (e.g., probability distribution as described in connection with FIG. 2), decreased by the time already spent in current state 322.

Although described as using the most likely switching time from the probability distribution as the property predicting a transition between states, embodiments of the present disclosure are not so limited. For example, the whole distribution can be used and a suitable value such as a maximum likelihood may be selected as the property to predict a transition between current state 322 and future state 324.

The prediction of a transition between states can be replicated infinitely. For example, the prediction can be utilized to predict a future state 324, and an additional future state 326. Additionally, the prediction can be used to predict further additional future states.

Prediction of additional future state 326 can include utilizing data from a number of previous states. For example, additional future state 326 can be two states in the future from the current state 322. The controller can utilize two previous states from current state 322 to predict additional future state 326. That is, the prediction of the number of future states can be based on a number of previous states equal to the number of predicted future states.

The controller can predict a future energy consumption of the device using the assigned energy consumption data (e.g., energy consumption data previously described in connection with FIG. 1) and the generated model (e.g., the generated model previously described in connection with FIG. 2). For example, the controller can utilize previous energy consumption data along with predicted transitions between states to generate load forecasting. That is, the controller can generate estimates of potential load demand for the device, as will be further described herein.

Although shown in FIG. 3 as a device comprising only an off state and an on state, embodiments of the present disclosure are not so limited. For example, the controller can predict a transition between each of a plurality of on states of a device using the probability distribution and an amount of time already spent by the device in the current on state using the techniques (e.g., most likely switching time from the probability distribution, using the entire distribution, etc.) previously described. Further, similar techniques can be utilized to predict future energy consumption of the device with an off state and a plurality of on states.

Generating estimates of potential load demand for the device can be useful for utility companies. For example, a utility company can utilize the potential load estimates to determine demand response capacity. That is, a utility company can compile data from a number of controllers connected to a number of residences with a number of devices to predict when an electrical demand might be high, and provide an adequate response to the rise in electrical demand.

Figure 4:
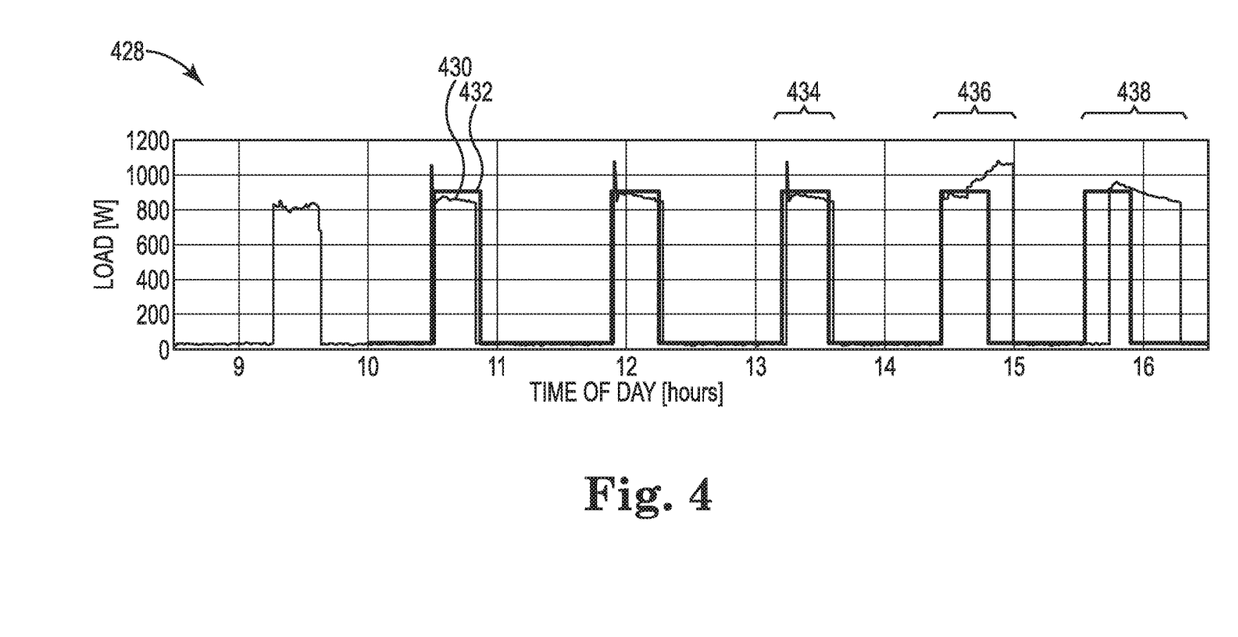
FIG. 4 illustrates an example comparison of predicted to measured states that can be utilized in one or more embodiments of the present disclosure.

FIG. 4 illustrates an example comparison of predicted to measured states 428 that can be utilized in one or more embodiments of the present disclosure. As shown in FIG. 2, the example comparison 428 can include assigned energy consumption data 430 and predicted energy consumption data 432.

A controller (e.g., controller 540, as described in connection with FIG. 5) can detect a fault of a device using the assigned energy consumption data 430 and the generated model (e.g., the model configured to predict a future state of a device and a duration of the future state of the device, as described in connection with FIG. 2). The generated model can include predicted energy consumption data 432.

Detecting a fault of the device can include comparing the assigned energy consumption data 430 to the predicted future energy consumption data 432. For example, as shown in FIG. 4, a first comparison 434 between assigned energy consumption data 430 and predicted energy consumption data 432 can be made. At first comparison 434, assigned energy consumption data 430 and predicted energy consumption data 432 appear to be in step without any drift, indicating that there is not currently any faults with the device.

A second comparison 436 can be made between assigned energy consumption data 430 and predicted energy consumption data 432. At second comparison 436, assigned energy consumption data 430 appears to drift from predicted energy consumption data 432. The drift of assigned energy consumption data 430 can indicate degradation of the device. The device may be using more energy than previous instances of on states, indicating that the device may need to be repaired due to an inefficiency in operation. For example, a worn part of the device may be causing the device to consume more energy than needed, resulting in the device consuming more energy.

A third comparison 438 can be made between assigned energy consumption data 430 and predicted energy consumption data 432. At third comparison 438, a step change of assigned energy consumption data 430 appears to occur from predicted energy consumption data 432. The step change of assigned energy consumption data 432 can indicate a fault of the device. For example, the device may be faulty in some regard and may need to be replaced.

Fault detection by the controller can provide financial benefits to residential users. For example, notification of a drift (e.g., a drift as shown in second comparison 436) of assigned energy consumption data 430 from predicted energy consumption data 432 to a residential user can allow the user to promptly replace a part that is causing a device to operate inefficiently relative to a normal operating state. Further, a step change (e.g., a step change as shown in third comparison 438) of assigned energy consumption data 430 from predicted energy consumption data 432 can lead to a user being notified of the fault and to replace the device, if needed.

Figure 5:
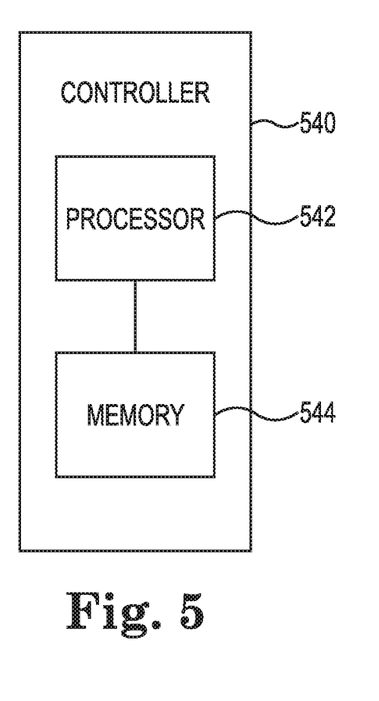
FIG. 5 is a schematic block diagram of a controller for energy consumption modeling, in accordance with one or more embodiments of the present disclosure.

FIG. 5 is a schematic block diagram of a controller 540 for energy consumption modeling, in accordance with one or more embodiments of the present disclosure. Controller 540 can be, for example, controllers previously described in connection with FIGS. 1-4. For example, controller 540 can include a memory 544 and a processor 542 configured for energy consumption modeling in accordance with the present disclosure.

The memory 544 can be any type of storage medium that can be accessed by the processor 542 to perform various examples of the present disclosure. For example, the memory 544 can be a non-transitory computer readable medium having computer readable instructions (e.g., computer program instructions) stored thereon that are executable by the processor 542 to assign energy consumption data to an on state and an off state of a device and generate a model configured to predict a future state of the device and a duration of the future state of the device based on a duration of a current state of the device, a duration of a previous state of the device, and operating conditions of the device. Further, processor 542 can execute the executable instructions stored in memory 544 to predict future energy consumption of the device using the assigned energy consumption data and the generated model.

The memory 544 can be volatile or nonvolatile memory. The memory 544 can also be removable (e.g., portable) memory, or non-removable (e.g., internal) memory. For example, the memory 544 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

Further, although memory 544 is illustrated as being located within controller 540, embodiments of the present disclosure are not so limited. For example, memory 544 can also be located internal to another computing resource (e.g., enabling computer readable instructions to be downloaded over the Internet or another wired or wireless connection).

As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processor. It is presumed that logic similarly executes instructions for purposes of the embodiments of the present disclosure.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A controller for an energy consumption modeling system, comprising:
   a memory; and
   a processor configured to execute executable instructions stored in the memory to:
      generate a model to predict a future state of a device and a duration of the future state of the device by predicting a transition between a current state of the device and the future state of the device using a probability distribution for a duration of the current state of the device and an amount of time already spent by the device in the current state;
      predict future energy consumption data of the device using energy consumption data of the device and the generated model;
      detect a fault of the device using the energy consumption data and the generated model in response to the energy consumption data being out of step from the predicted future energy consumption data based on the duration of the current state of the device being longer or shorter than the duration of the predicted future state of the device; and
      generate a notification in response to the fault of the device being detected.

2. The controller of claim 1, wherein the processor is configured to execute the instructions to detect the fault by comparing the energy consumption data to the predicted future energy consumption data.

3. The controller of claim 1, wherein the processor is configured to execute the instructions to detect the fault of the device in response to the energy consumption data being different from the predicted future energy consumption data.

4. The controller of claim 3, wherein the energy consumption data being different from the predicted future energy consumption data indicates degradation of the device.

5. The controller of claim 1, wherein the processor is configured to execute the instructions to determine no fault of the device exists in response to the energy consumption data being the same as the predicted future energy consumption data.

6. The controller of claim 1, wherein the controller is at least one of:
   a part of a residential thermostat;
   a thermostatically controlled device; and
   a part of an energy meter.

7. The controller of claim 1, wherein the energy consumption data includes:
   energy consumption data of an on state of the device; and
   energy consumption data of an off state of the device.

8. The controller of claim 1, wherein the probability distribution is a function of a duration of a previous state of the device and operating conditions of the device.

9. A non-transitory computer readable medium having computer readable instructions stored thereon that are executable by a processor to:
generate a model to predict a future state of a device and a duration of the future state of the device by predicting a transition between a current state of the device and the future state of the device using a probability distribution for a duration of the current state of the device and an amount of time already spent by the device in the current state;
predict future energy consumption data of the device using energy consumption data of the device and the generated model;
compare the energy consumption data to the predicted future energy consumption data;
determine a fault of the device in response to the energy consumption data being out of step from the predicted future energy consumption data based on the duration of the current state of the device being longer or shorter than the duration of the predicted future state of the device; and
generate a notification in response to the fault of the device being detected.

10. The computer readable medium of claim 9, wherein the computer readable instructions are executable by the processor to determine the fault in response to at least one of:
the energy consumption data being higher than the predicted future energy consumption data; and
the energy consumption data being lower than the predicted future energy consumption data.

11. The computer readable medium of claim 9, wherein the computer readable instructions are executable by the processor to predict the future state of the device and the duration of the future state of the device based on:
the duration of the current state of the device;
a duration of a plurality of previous states of the device; and
operating conditions of the device.

12. The computer readable medium of claim 9, wherein:
the energy consumption data is associated with the current state of the device; and
the predicted future energy consumption data is associated with the future state of the device.

13. A method for operating an energy consumption modeling system, comprising:
generating, by a controller, a model to predict a future state of a device and a duration of the future state of the device by predicting a transition between a current state of the device and a future state of the device using a probability distribution for a duration of the current state of the device and an amount of time already spent by the device in the current state;
predicting, by the controller, future energy consumption data of the device using energy consumption data of the device and the generated model;
comparing, by the controller, the energy consumption data to the predicted future energy consumption data;
detecting, by the controller based on the comparison:
a fault of the device in response to the energy consumption data being out of step from the predicted future energy consumption data based on the duration of the current state of the device being longer or shorter than the duration of the predicted future state of the device; and
that no fault of the device exists in response to the energy consumption data being the same as the predicted future energy consumption data; and
generating, by the controller, a notification in response to detecting the fault of the device.

14. The method of claim 13, wherein the method includes:
determining, by the controller, outlier data included in the energy consumption data; and
generating, by the controller, the probability distribution while ignoring the outlier data.

15. The method of claim 13, wherein the method includes receiving the energy consumption data from an energy meter.

16. The method of claim 13, wherein the method includes updating the model based on additional energy consumption data received from an energy meter.

17. The method of claim 13, wherein the method includes generating a demand response capacity based on the predicted future energy consumption data.

18. The method of claim 13, wherein the method includes generating the probability distribution for the duration of the current state of the device as a function of a duration of a previous state of the device and operating conditions of the device.

* * * * *